United States Patent [19]

Katagiri et al.

[11] Patent Number: 4,841,366
[45] Date of Patent: Jun. 20, 1989

[54] CYCLIC NOISE REDUCING APPARATUS

[75] Inventors: Toshiyuki Katagiri; Kazuhisa Marukado, both of Osaka, Japan

[73] Assignee: NEC Home Electronics Ltd., Osaka, Japan

[21] Appl. No.: 32,828

[22] Filed: Mar. 31, 1987

[30] Foreign Application Priority Data

Mar. 31, 1986 [JP] Japan ................................. 61-73349
May 26, 1986 [JP] Japan ................................ 61-120550

[51] Int. Cl.$^4$ ........................................... H04N 5/213
[52] U.S. Cl. ........................................ 358/167; 358/36
[58] Field of Search ................. 358/167, 166, 160, 36, 358/37, 905, 336, 340

[56] References Cited

U.S. PATENT DOCUMENTS

4,291,333  9/1981  Warnock ............................. 358/167
4,434,438  2/1984  Rzeszewski ......................... 358/167

Primary Examiner—Tommy P. Chin
Attorney, Agent, or Firm—Cushman, Darby & Cushman

[57] ABSTRACT

A cyclic noise reducing apparatus for reducing noise in video signals by positively feeding back an output video signal which has been delayed through a field memory circuit for storing and selectively delaying video signals by a field (n lines) or by a field plus one line (n+1 lines) and cyclically adding the output video signal to an input video signal. The delay time is selected using a delay time switch for switching during a vertical scanning period the delay time of the signal positively fed back alternately between n and n+1 line periods. Also, the video signal may be alternately delayed by n or n+1 lines by suspending the writing and reading of data to and from the field memory circuit for one line period during the vertical blanking period of each frame.

13 Claims, 6 Drawing Sheets

INPUT VIDEO SIGNAL

FIG. 2(B)
PRIOR ART

OUTPUT VIDEO SIGNAL

FIG. 3
PRIOR ART

FIG. 4(A)
PRIOR ART
INPUT VIDEO SIGNAL

FIG. 4(B)
PRIOR ART
OUTPUT VIDEO SIGNAL

TIME →

ONE LINE PERIOD

FIG. 5

FIG.6(A) PRIOR ART
INPUT VIDEO SIGNAL

FIG.6(B) PRIOR ART
OUTPUT VIDEO SIGNAL

FIG.9
(A) ROW ADDRESS STROBE PULSE

FIG.9
(B) COLUMN ADDRESS STROBE PULSE

FIG.9
(C) ADDRESS SIGNAL

FIG.9
(D) OUTPUT ENABLE SIGNAL

FIG.9
(E) READ OUT DATA

FIG.9
(F) WRITE ENABLE SIGNAL

FIG.9
(G) WRITE IN DATA

FIG. 10

CYCLIC NOISE REDUCING APPARATUS

BACKGROUND OF THE INVENTION

The present invention relates to a cyclic noise reducing apparatus for reducing noise in a video signal using the field correlation of the video signal.

A video tape recorder of the prior art is designed to record a chrominance signal in a low frequency range and to frequency multiplex this signal on a frequency modulated luminance signal. However, when a luminance signal including noise is demodulated during recording or playback, a triangular noise characteristic of the frequency modulation/demodulation system increases as the frequency increases. Accordingly, before the luminance signal is modulated, high frequency portions of the luminance signal are generally emphasized using a pre-emphasis circuit, and a de-emphasis circuit is used to restore the pre-emphasized signal to its original form for signal playback. However, because the de-emphasized luminance signal still includes noise, a cyclic noise reducing apparatus such as that shown in FIG. 1 may need to be connected to the de-emphasis circuit to eliminate this noise.

Figure 1:
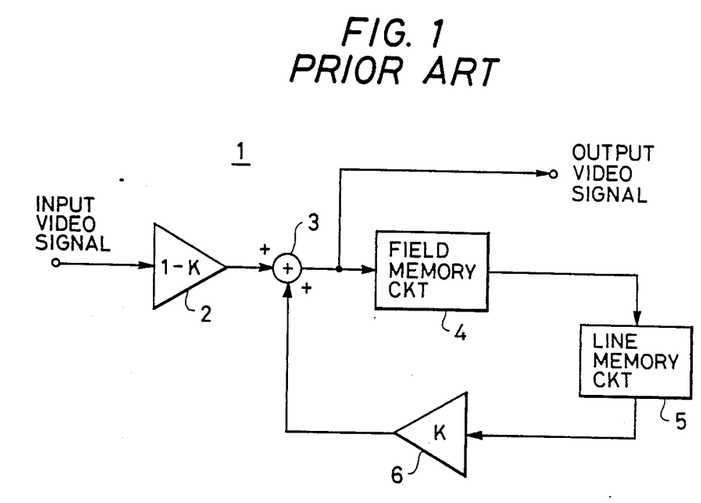
FIG. 1 shows a circuit configuration of a conventional cyclic noise reducing apparatus.

The cyclic noise reducing apparatus shown in FIG. 1 suppresses the noise component using the difference between the noise with a high field correlation and a video signal which is almost free from field correlation. The noise component is suppressed by cyclically adding the output video signal to an attenuated input video signal. The input video signal is first supplied to an adder 3 through an attenuator circuit 2 with a gain of $1-K$, where $0<K<1$. The adder 3 receives as one input the output video signal via a positive feedback circuit including a field memory circuit 4, a line memory circuit 5, and an attenuator circuit 6. The input video signal is also received by the adder as a second input. The positive feedback circuit is arranged so that the line memory circuit 5 for storing and delaying video signals corresponding to one line is connected in series to the field memory circuit 4 which stores and delays video signals corresponding to a field (262 lines for NTSC) and so that a gain of K is applied to the delayed signal by attenuator circuit 6. As a result, an output video signal corresponding to an input signal delayed by an extra line (263 lines for NTSC) is also attenuated and positively fed back. In this case, the closer the gain K of attenuator 6 is to 1, the higher the degree of signal to noise (SN) improvement obtained by the cyclic noise reducing apparatus of FIG. 1.

Figure 2A:
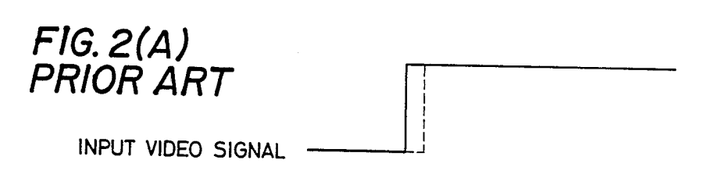
FIGS. 2A and 2B show signal waveforms of the circuit shown in FIG. 1.
Figure 2B:
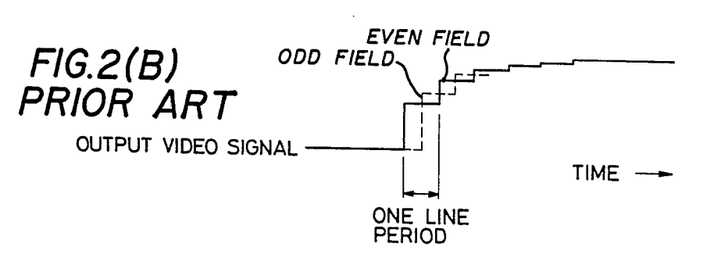

The conventional cyclic noise reducing apparatus of FIG. 1 utilizing the field correlation is advantageous in that the storage capacity required is only half that of a frame memory circuit, and even when displaying animated cartoons which are normally fast in motion, a ghost image is less noticeable than when frame correlation is used. On the other hand, the image signal circulating through the series circuit consisting of the field memory circuit 4 and the line memory circuit 5 is delayed by approximately ½ line relative to the inputted line each time it is fed back. In this case, the quantity thus added by positive feedback is multiplied by a gain K raised to the nth power, where n is the number of cycles, and the greater the number of cycle repetitions n made by a signal becomes, the less the influence upon the output exhibited by the fed back signal when it is added. However, because the signals gradually lose correlation each time they are fed back and added together, the response of the output video signal to an input video signal rising in step forms, as shown in FIG. 2A, is represented by a step waveform at a line pitch during its rising time, thereby exhibiting a curved change similar to the step response of a general low-pass filter circuit as shown in FIG. 2B. In FIGS. 2A and 2B, this phenomenon is represented by continuous and dotted lines which designate signals of even and odd number fields, respectively. This shortcoming is inherent in the cyclic noise reducing apparatus of FIG. 1 and causes deterioration in vertical resolution.

Figure 3:
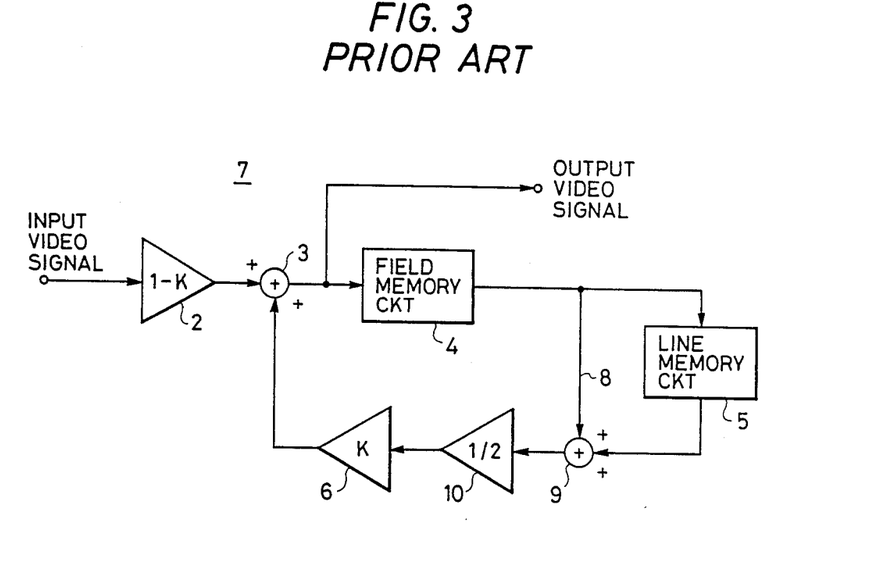
FIG. 3 shows a circuit configuration of another conventional cyclic noise reducing apparatus.

As a further example, in the cyclic noise reducing apparatus shown in FIG. 3, a line memory circuit 5 connected to a field memory circuit 4 and a signal line 8 bypassing the line memory circuit 5 are connected to an adder 9 in parallel, and an attenuator circuit 10 for attenuating the sum signal level by ½ is connected between the adder 9 and attenuator circuit 6. The arrangement of FIG. 3 was proposed to reduce noise by causing the mean value of a first video signal delayed by the field memory circuit 4 to be delayed by a field (262 lines) and a second video signal delayed by the line memory circuit 5 to be delayed by one additional line (263 lines).

Figure 4A:
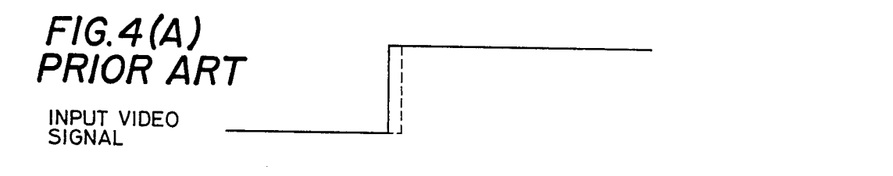
FIGS. 4A and 4B show signal waveforms of the circuit shown in FIG. 3.
Figure 4B:
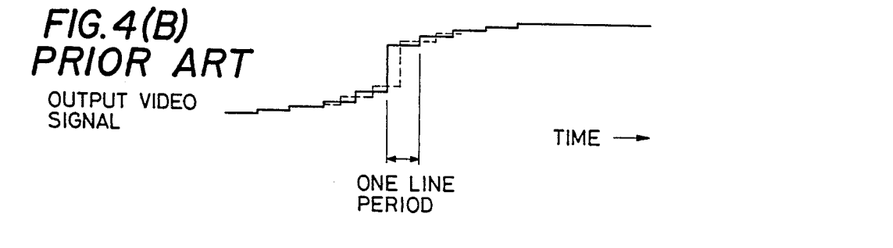

The vertical resolution in the FIG. 3 cyclic noise reducing apparatus would appear to experience less deterioration than the apparatus of FIG. 1. However, as is obvious from the step response output shown in FIG. 4B, responsive to the step response input shown in FIG. 4A, the signal delayed by 262 lines and the signal delayed by 263 lines form step waveforms at a line pitch in front or behind the rising of the step input. As in the FIG. 1 apparatus, the vertical resolution is deteriorated by the FIG. 3 apparatus in the manner shown.

SUMMARY OF THE INVENTION

The present invention solves the aforesaid problems by letting signal delay time in a positive feedback circuit using field correlation coincide with the line period of a frame, thereby preventing vertical resolution from deteriorating because signals which are attenuated and cyclically superposed do not lose their correlation due to line shifting.

The cyclic noise reducing apparatus in accordance with the present invention reduces noise in video signals by positively feeding back an output video signal delayed through a field memory circuit which stores and delays video signals by a field (n lines) or by a field plus an extra line (n+1 lines) and adding the delayed output video signal cyclically to the input video signal. A delay time switching means is provided for alternately switching during the vertical scanning period the delay time of the signal positively fed back between n and n+1 line periods.

The cyclic noise reducing apparatus in accordance with the present invention also comprises a control circuit for alternately delaying the signals by n or n+1 lines by suspending the writing and reading of data to and from the field memory circuit for one line period during a vertical blanking period within a frame.

DETAILED DESCRIPTION OF THE INVENTION

The present invention will now be described with reference to the drawings. In the drawings, like reference numbers designate like members.

Figures 5, 6A:
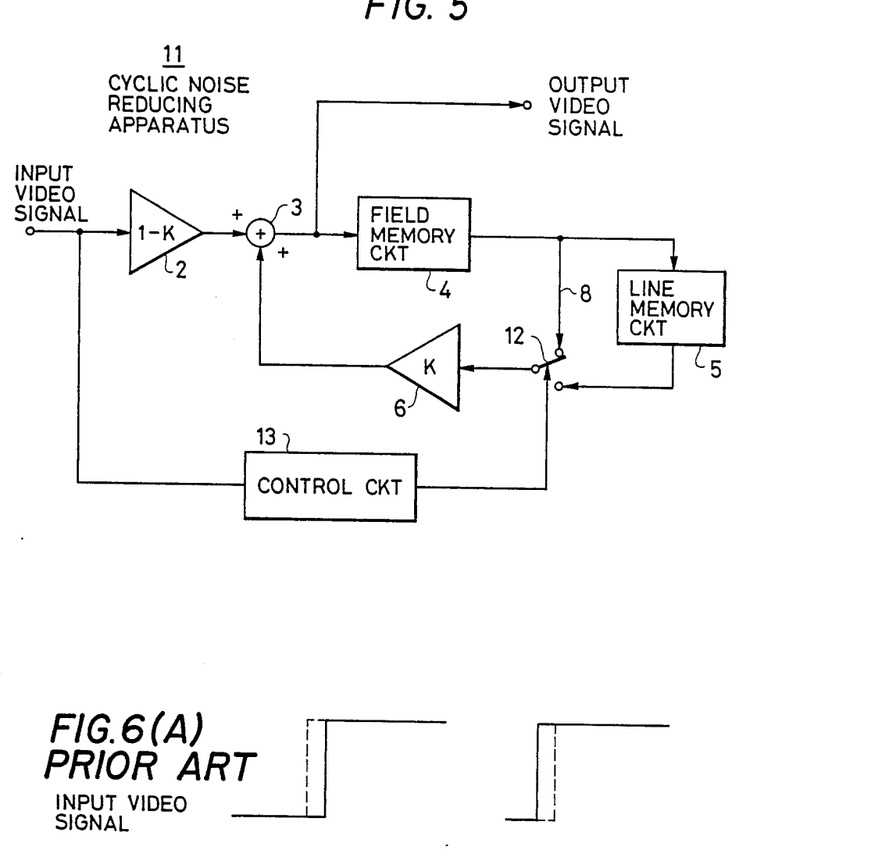
FIG. 5. shows a circuit configuration of a cyclic noise reducing apparatus embodying the present invention.
FIGS. 6A and 6B show signal waveforms of the circuit shown in FIG. 5.

As shown in FIG. 5, the cyclic noise reducing apparatus has a positive feedback path as in the prior art cyclic noise reducing apparatuses of FIGS. 1 and 3. The positive feedback path comprises the series combination of a field memory circuit 4 and an attenuator circuit 6 connected in the feedback direction. Thus, the cyclic noise reducing apparatus of FIG. 5 also uses field correlation for reducing noise in video signals by delaying the input video signal for one field period and cyclically adding the delayed signal to the input signal.

In the enbodiment of FIG. 5, a line memory circuit 5 is connected to the field memory circuit 4 in parallel with a signal line 8. Both paths are connected to the attenuator circuit 6 through a changeover switch 12. The changeover switch 12 is controlled by a switching pulse supplied by a control circuit 13 during a vertical scanning period such that the switching operation alternately connects the line memory circuit 5 and the signal line 8 to the attenuator circuit 6. The control circuit employed in this embodiment detects the vertical synchronizing signal contained in the input video signal and forms a pulse immediately before the vertical synchronizing period and further produces the switching pulse during the vertical scanning period by dividing the pulse thus formed into two halves.

The input video signal to which the output video signal is added at adder 3 is thus alternately delayed by a field (for example, 262 lines) or by a field plus one extra line (263 lines) before reaching the attenuator circuit 6. As a result, a signal delay of a frame (525 lines) is implemented to prevent the deterioration of vertical resolution attributed to video signal shifting of ½ line, which causes problems in the conventional noise reducing methods employing field correlation.

Figure 6B:
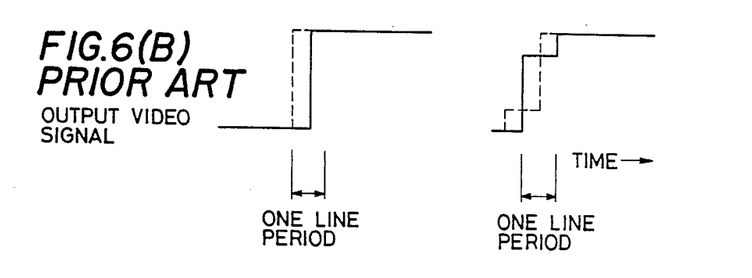

FIG. 6A shows an input waveform for the circuit of FIG. 5, and FIG. 6B shows an output signal waveform for the step input of FIG. 6A. As shown in the first half of the time base of FIG. 6B, the output video signal waveform completely coincides with the input video signal provided the input video signal has the same contents as the signal content for an input video signal one field prior to the present input video signal. Noise is thus reduced without deteriorating the vertical resolution.

As shown in the second half of the time base of FIG. 6B, on the other hand, when the image contents of the input video signal differ from those of the input video signal of the previous frame because of the difference in the delay (262 or 263 lines) or because the step input video signal starts with an even or an odd number field, depending on the state of the changeover switch 12 at the time of the step input, the input waveform is different from the output waveform for only one line period preceding or following the step change. Thus, no transformation of the waveform resulting in the deterioration of vertical resolution occurs. Consequently, in the cyclic noise reducing apparatus of FIG. 5, the most closely correlated signals are always cyclically added together.

The line memory circuit 5 for storing and delaying video signals by one line is arranged so that it is switched between the field memory circuit 4 and the attenuator circuit 6 during the vertical scanning period when the output video signal is delayed for one field period, attenuated by the attenuator circuit 6, positively fed back and added to the input video signal. In this manner, the signal delay time in the positive feedback circuit is made to coincide with the 525 line period of a frame delay. The coincidence satisfactorily prevents the deterioration of vertical resolution attributed to the signals being cyclically superposed after the delay and attenuation have caused the signals to lose correlation by line shifting. Although the signals thus cyclically superposed undergo transitional fluctuation to some degree, the vertical resolution is only slightly affected. Consequently, high vertical resolution can be obtained with the noise reducing system of FIG. 5 by employing frame correlation using a field delay.

Figure 7:
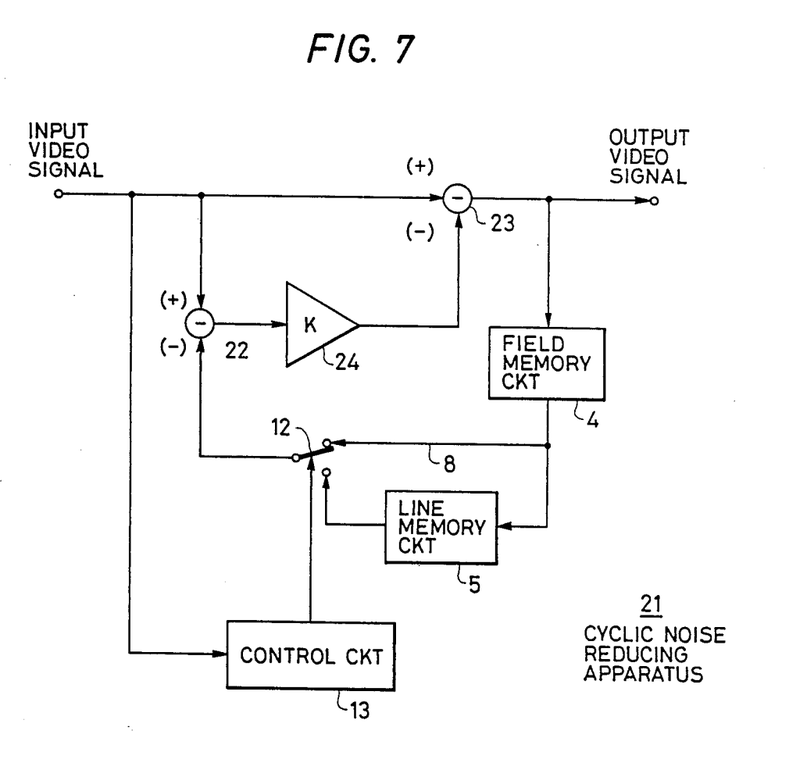
FIG. 7 shows a modified circuit configuration of the cyclic noise reducing apparatus shown in FIG. 5.

FIG. 7 shows a modified embodiment of the cyclic noise reducing apparatus of FIG. 5. This cyclic noise reducing apparatus includes two subtractors 22, 23 and a single attenuator circuit 24 with a coefficient K ($0 < K < 1$) arranged between these subtractors. The input video signal is amplified ($1-K$) times by being subtracted by both the subtractors 22 and 23 sequentially, and the delayed output video signal obtained by delaying the output of the subtractor 23 is amplified K times by attenuator circuit 24. In this embodiment, the signal delay time of the positive feedback path coincides with a 525 line period of a frame delay by selectively connecting the line memory circuit 5 between the field memory circuit 4 and the subtractor 22.

The embodiment of FIGS. 5 and 7 is arranged such that the parallel combination of the line memory circuit 5, the signal line 8, the changeover switch 12, and the control circuit 13 constitute a delay time switching means. However, by forming the 262 line field memory circuit 4 into what is equivalent to a 263 line memory by fixing the address of the field memory circuit 4 for one line period and reading out an additional address for one line period using the control circuit 13, it is possible for only the field memory circuit 4 and the control circuit 13 to be used as the delay time switching means.

In this embodiment, the vertical synchronizing signal of the input video signal also has its edges shifted by ½ line; therefore, if the signal is passed by the cyclic noise reducing apparatus, the rising of the edge becomes inconspicuous. Consequently, the gain K of the attenuator circuit 6 should be reduced to zero for the period of the vertical synchronizing signal.

Figure 8:
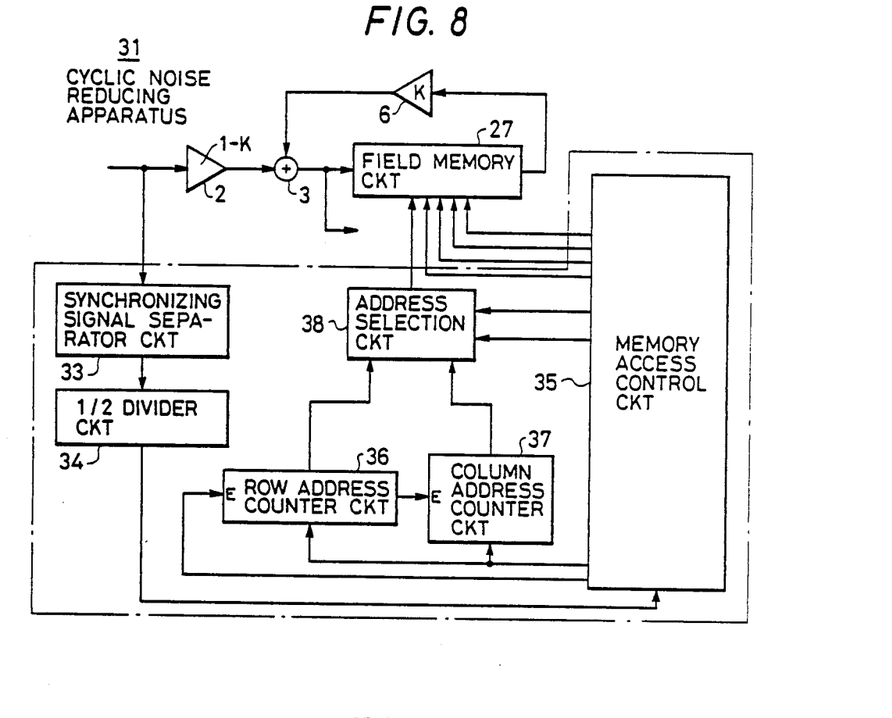
FIG. 8 shows a circuit configuration of another embodiment of a cyclic noise reducing apparatus in accordance with the present invention.
Figure 9:
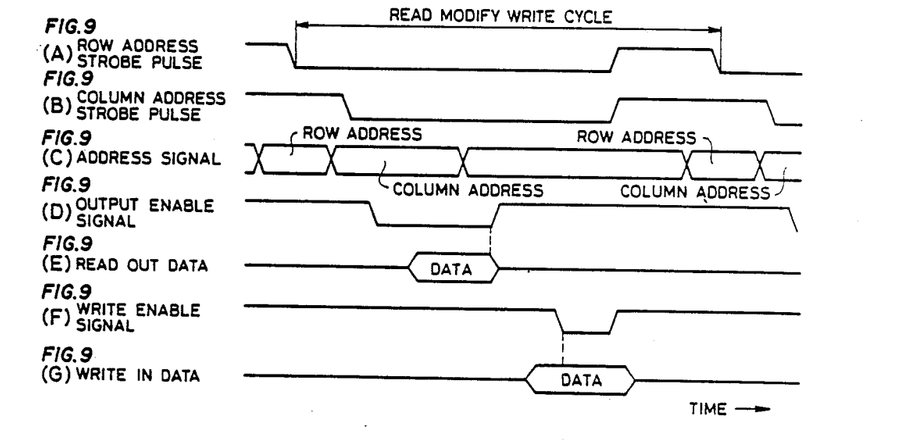
FIGS. 9A–9G show signal waveforms of the circuit shown in FIG. 8.

FIGS. 8 and 9 show a circuit configuration and signal waveforms for another embodiment of a cyclic noise reducing apparatus in accordance with the present invention, wherein only a field memory circuit and a control circuit are used.

As shown in FIG. 8, cyclic noise reducing apparatus 31 has a positive feedback path comprising the series combination of a field memory circuit 27 for storing and delaying video signals by 262 lines and an attenuator circuit 6 connected in the feedback direction. The cyclic noise reducing apparatus of FIG. 8 is also arranged to make use of the field correlation for reducing noise in video signals by delaying an input video signal for one field period and cyclically adding the input signal to a delayed input signal. In this cyclic noise reducing apparatus, a control circuit 32 is used to control the timing at which data is written into and read out of the field memory circuit 27 such that the signals delayed and attenuated by the field memory circuit 27 and attenuator 6 which are cyclically superposed do not lose their correlation due to line shifting.

The control circuit 32 includes a synchronizing separator circuit 33, a ½ divider circuit 34, a memory access control circuit 35, a row address counter circuit 36, a column address counter circuit 37 and an address selection circuit 38. The synchronizing separator circuit 33 detects a vertical synchronizing signal contained in the input video signal and, by delaying the vertical synchronizing signal, forms a pulse immediately before the next synchronizing signal. The ½ divider circuit 34 divides by ½ the output of the synchronizing separator circuit 33 and supplies the output thus divided to the memory access control circuit 35. The memory access control circuit 35 is then used to control the field memory circuit 27, row address counter circuit 36, column address counter circuit 37 and address selection circuit 38. Both the row address counter circuit 36 and the column address counter circuit 37 form a synchronizing counter circuit to sequentially update the address on receiving a count clock pulse supplied by the memory access control circuit 35. The address selection circuit 38 is arranged between both the address counter circuits 36 and 37 and the field memory circuit 27. The memory access control circuit 35 controls the address selection circuit 38 with a row/column selection signal for selecting one of the address counter circuits 36 and 37 and produces address data synchronous with the row and column address strobe pulses by means of an output latch pulse.

The column address counter circuit 37 is supplied with a count enable signal from the row address counter circuit 36, and the row address counter circuit 36 is supplied with a count enable signal from the memory access control circuit 35. When these count enable signals both are at a high level, both the address counter circuits 36 and 37 perform counting operations, and when the counter enable signal in the latter is set at a low level, both counter circuits stop counting. Thus, in the FIG. 8 embodiment, the memory access control circuit 35 supplies the row address counter circuit 36 with a count stop signal (the count enable signal at low level) on receiving the control signal supplied by the ½ divider circuit 34.

In the FIG. 8 embodiment, a 256K general dynamic random access memory is used as the field memory circuit 27, and it is arranged so that a read modify write cycle is executed by inputting the address data on an 8-bit basis in the row and column directions under time sharing control. In addition, the field memory circuit 27 receives a write enable signal and an output enable signal from memory access control circuit 35 in addition to the row and column address strobe pulses. For this reason, the data being written into the field memory circuit 27 and that being read out therefrom have a predetermined phase relation.

If during operation the field memory circuit 27 delays a signal by 262 lines in an odd number field, in the following even number field, on receiving the control signal from the ½ divider circuit 34 the memory access control circuit 35 supplies a low level count enable signal, (i.e., a count stop command) for one line period to the row address counter circuit 36 immediately before the vertical synchronizing signal. As a result, the writing and reading of data to and from the field memory circuit 27 are stopped for just one line period. During the one line period, the video data written to the field memory circuit 27 is supplied to the attenuator 6 as the output of the field memory circuit 27. Thus, in the present system, for a field correlated video signal, the field memory circuit 27 implements a signal delay of 263 lines for the even number field such that the delay of a signal by one additional line is deemed to have been accomplished under the control of the writing and reading of data to and from the field memory circuit 27.

Accordingly, fields of video signals supplied to the cyclic noise reducing apparatus of FIG. 8 are alternately subjected to signal delays of 263 lines until they reach the attenuator circuit 6. As a result, the output of the attenuator circuit 6 appears as if a signal delay of 525 lines was executed. It thus becomes possible to effectively prevent the deterioration of vertical resolution resulting from the shifting of the video signal by ½ line.

In the cyclic noise reducing apparatus of FIG. 8, the writing and reading of data to and from the field memory circuit 27 for storing and delaying video signals by 262 lines are stopped for one line period during the vertical blanking period of a video frame after being delayed by the field memory circuit 27. The delayed signal is then attenuated by the attenuator circuit 6, fed back and added to the input video signal so as to alternately delay the signals by 262 or 263 lines. Consequently, the signal delay time in the positive feedback circuit of the FIG. 8 apparatus may coincide with the 525 line period of a frame. Thus, it becomes possible to effectively prevent the deterioration of the vertical resolution caused by the signals being cyclically superposed after delay and attenuation cause line shifting which in turn causes field correlation to be lost. Moreover, although the signals thus cyclically superposed undergo some transitional fluctuation, the vertical resolution is only slightly affected.

Figure 10:
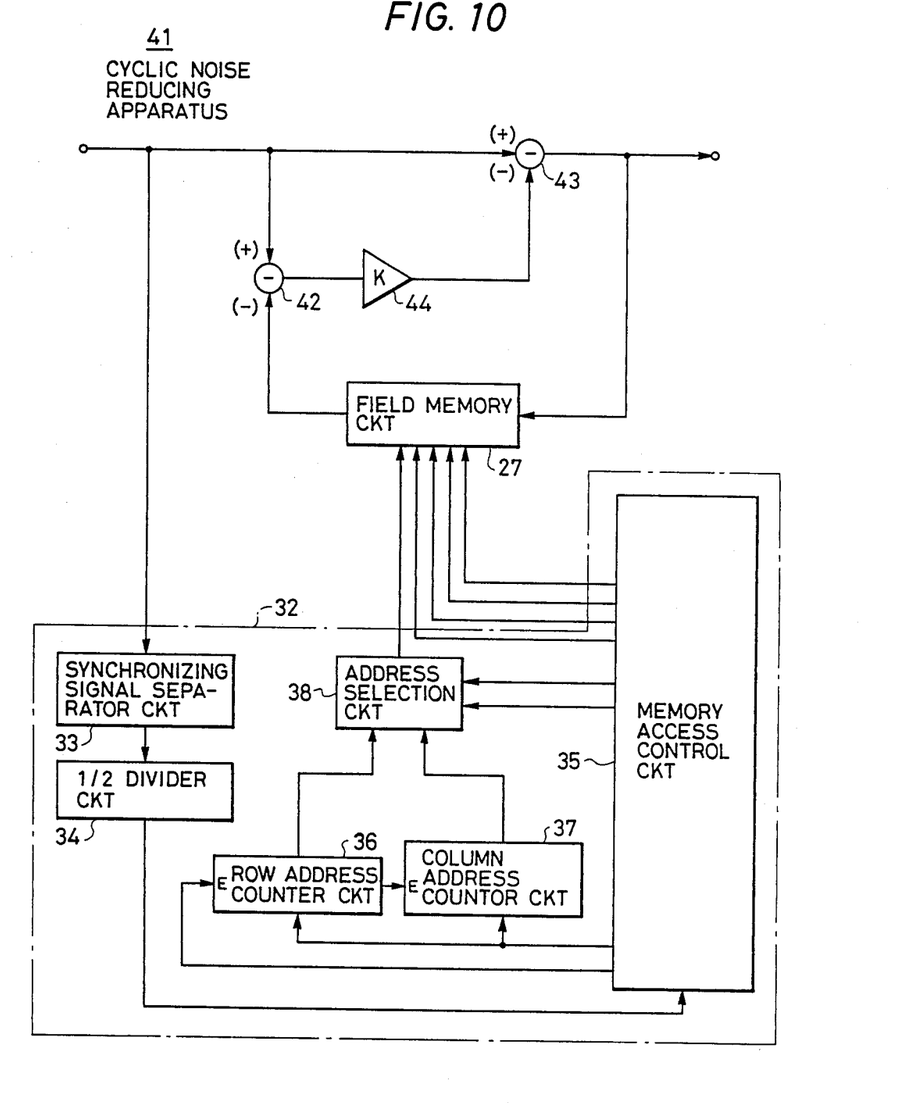
FIG. 10 shows a modified circuit configuration of the cyclic noise reducing apparatus shown in FIG. 8.

FIG. 10 shows a modification of the embodiment of the cyclic noise reducing apparatus of FIG. 8. This cyclic noise reducing apparatus includes two subtractors 42 and 43 and a single attenuator circuit 44 with a coefficient K ($0<K<1$) arranged between these subtractors. The input video signal is amplified (1-K) by being subtracted by both the subtractors 42 and 43 sequentially, and the delayed output video signal obtained by delaying the output of the subtractor 43. In this embodiment, the writing and reading of data to and from the field memory circuit 27 also are stopped by control circuit 32 for one line period during the vertical blanking period of the frame, and the signal delay time in the positive feedback circuit coincides with the 525 line period as in the FIG. 8 circuit.

Although only a few exemplary embodiments of this invention have been described in detail above, those skilled in the art will readily appreciate that several modifications are possible in the preferred embodiments without materially departing from the novel teachings and advantages of this invention. For example, one skilled in the art will readily appreciate that the present invention may be implemented for systems having frames containing a different number of lines, such as for 625 lines/frame systems. Accordingly, all such modifications are intended to be included in the invention as defined by the following claims.

What is claimed is:

1. A noise reducing apparatus comprising:
   means for delaying an input video signal by n lines for a first field and by n+1 lines for a second field to obtain a delayed video signal;
   means for cyclically adding said delayed video signal for each field to a subsequent signal of said input video signal to obtain an output video signal having reduced noise; and
   means for causing the delay of said first and second fields to be equal to a delay period of a frame delay to avoid half line shifting of said input video signal, said delay period corresponding to a delay of 2n+1 lines.

2. An apparatus in accordance with claim 1, wherein said first field is odd and said second field is even.

3. An apparatus in accordance with claim 1, wherein said delaying means comprises a field memory circuit for delaying by n lines said input video signal to provide a field delayed video signal and a line memory circuit connected in series with said field memory circuit for delaying said field delayed video signal by one line to provide a field and line delayed video signal.

4. An apparatus in accordance with claim 3, wherein said delay causing means comprises a switching means connected to an output of said field memory circuit and to an output of said line memory circuit, respectively, said switching means alternatively connecting the output of said field memory circuit and the output of said line memory circuit which results in the output of said delayed video signal to said adding means during the vertical scanning period of said input video signal.

5. An apparatus in accordance with claim 4, wherein said delay causing means further comprises a control circuit coupled to said switching means for connecting the output of said field memory circuit to said adding means for said first field and for connecting the output of said line memory circuit to said adding means for said second field.

6. An apparatus in accordance with clam 1, wherein said adding means comprises first and second serially connected subtractors, the difference between said subsequent input video signal and said delayed video signal being determined by said first subtractor, said difference then being attenuated by an attenuating means and applied as a first input to said second subtractor, the second input of second subtractor receiving said subsequent input video signal, and the output of said second subtractor representing said output video signal having reduced noise.

7. An apparatus in accordance with claim 1, wherein said delay causing means comprises:
   a field memory circuit for storing n lines of said input video signal;
   a vertical synchronizing separator responsive to said input video signal;
   a ½ divider for dividing the output of said vertical synchronizing separator; and
   memory access control means responsive to the output of said divider for suspending storing of said input video signal and outputting of said delayed video signal to and from said field memory circuit for one line period during a vertical blanking period.

8. An apparatus in accordance with claim 7, wherein said adding means comprises first and second serially connected subtractors, the difference between said another input video signal and said delayed video signal being determined by said first subtractor, said difference then being attenuated by an attenuating means and applied as a first input to said second subtractor, the second input of said second subtractor receiving said another input video signal, and the output of said second subtractor representing an output video signal having reduced noise.

9. A noise reducing apparatus comprising:
   means for delaying an input video signal by 262 lines for a first field and by 263 lines for a second field;
   means for cyclically adding a delayed video signal for each field to a subsequent signal of said input video signal to obtain an output video signal with reduced noise; and
   means for causing the delay of said first and second fields to be equal to a 525 line delay period of a frame delay to avoid half-line shifting of said input video signal for each field.

10. A noise reducing apparatus comprising:
    means for delaying an input video signal by 262 lines for a first field and by 263 lines for a second field;
    means for cyclically adding a delayed video signal for each of said first and second fields to a subsequent signal of said input video signal to reduce noise; and
    means for switching the delay time of said delayed video signal between 262 and 263 lines during a vertical scanning period of said input video signal to avoid half line shifting of said input video signal.

11. An apparatus in accordance with claim 10, wherein said delaying means comprises a field memory circuit for delaying said input video signal 262 lines to provide a field delayed video signal and a line memory circuit connected in series with said field memory circuit for delaying said field delayed video signal by one line, said switching means being connected to an output of said field memory circuit and to an output of said line memory circuit, respectively, said switching means alternately switching between the output of said field memory circuit and the output of said line memory circuit during the vertical scanning period of said input video signal.

12. A noise reducing apparatus for reducing noise in video signals comprising:
    means for temporarily storing an input video signal so as to delay said input video signal by 262 lines to obtain a delayed video signal;
    means for cyclically adding said delayed video signal to a subsequent signal of said input video signal to obtain an output video signal with reduced noise; and
    means for suspending the writing and reading of data to and from said storing means for one line period during a vertical blanking period within a frame period to avoid half-line shifting of said input video signal for each field.

13. An apparatus in accordance with claim 12, wherein said data written to the storing and delaying means from the previous field is supplied to said adding means during said one line period during the vertical blanking period in which the writing and reading of data are suspended.

* * * * *